United States Patent Office 3,372,311
Patented Mar. 5, 1968

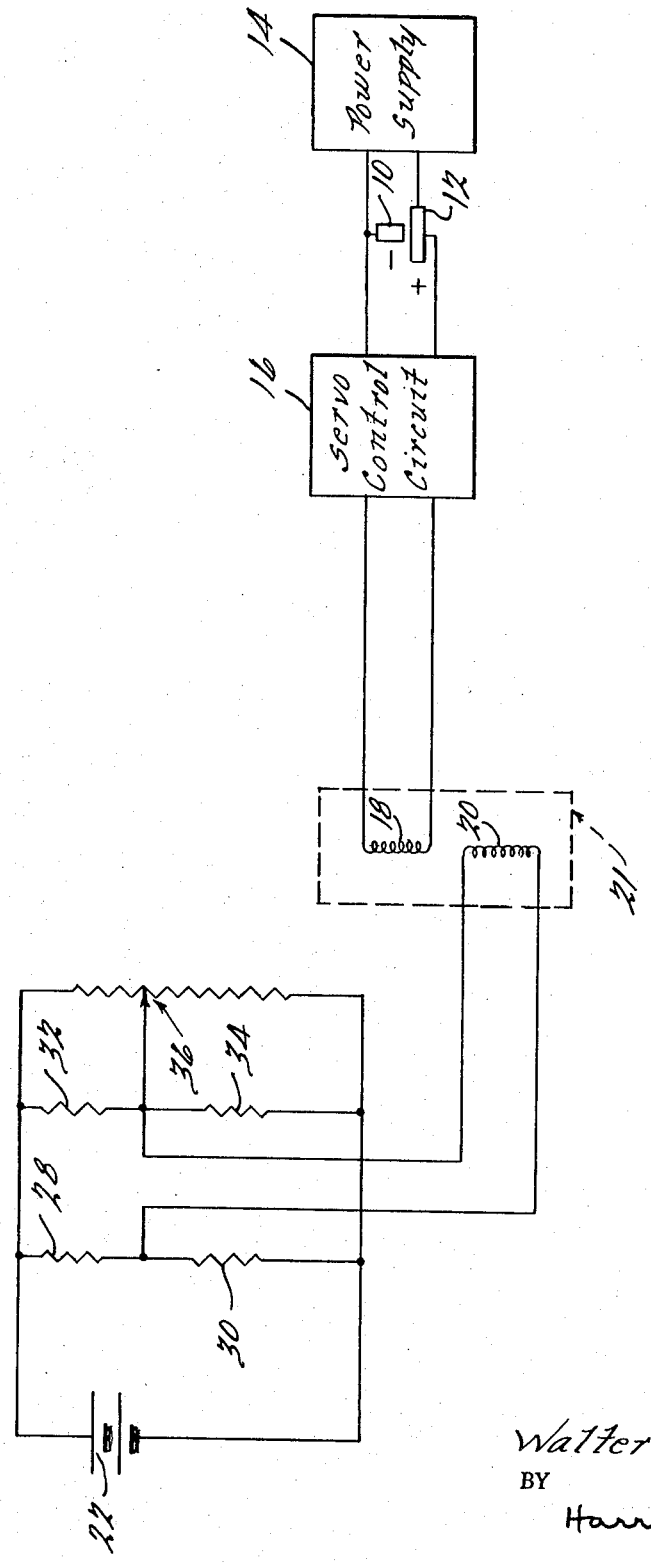

3,372,311
BALANCING CIRCUIT FOR ELECTRICALLY CONTROLLED HYDRAULIC SERVO SYSTEMS
Walter Lobur, Clawson, Mich., assignor to Elox Corporation, Troy, Mich., a corporation of Michigan
Filed Sept. 16, 1965, Ser. No. 487,843
10 Claims. (Cl. 317—123)

This invention relates generally to electrically controlled hydraulic systems and, more particularly, to an improved null balancing system therefor.

A problem encountered in any electrohydraulic servo system is that of providing a readily adjustable null for the system. Any electrohydraulic servo system is subject to hysteresis effect, temperature shift, and to other factors in the system which give rise to a shift of the null or stable state of the system. Various types of manually operated ganged potentiometer arrangements and the like have been used in an attempt to solve this problem.

It is an object of this invention to provide a new and improved adjustable balancing circuit for an electrically controlled hydraulic system.

It is an additional object of this invention to provide a manually adjustable balancing circuit in which the range of adjustment is initially of relatively low sensitivity corresponding to low servo velocity and but with gradually increasing servo velocity up to full manual feed velocity.

It is a further object of this invention to provide an improved non-linear resistance element.

My invention will be better understood by reference to the accompanying drawing, in which:

The drawing shows a combined schematic and block diagram representation of the invention as incorporated, by way of example, in an electrical discharge machine servo feed system.

In electrical discharge machining, the tool electrode 10 is normally advanced toward the electrically conductive workpiece 12 with a dielectric coolant being maintained in the gap. A power supply 14 is utilized to furnish maching pulses across the gap to electrically remove workpiece particles therefrom. One example of a power supply suitable for producing high frequency machining pulses across the machining gap is shown and described in Webb U.S. Patent 3,062,985, issued Nov. 6, 1962. In order to control the gap spacing between electrode 10 and workpiece 12 and to maintain this spacing at an optimum during machining, a servo control circuit 16 is employed which, responsive to a gap parameter representative of gap spacing, provides bi-directional current flow through a suitable electro-hydraulic valve control coil 18 to initiate the backup or downfeed of the electrode 10. An example of a suitable servo control circuit is shown and described in Webb Reissue 25,580, issued on May 19, 1964. When the gap spacing is relatively large, the voltage sensed at the gap will be relatively high and will initiate downfeed. When the gap spacing becomes relatively small or gap short circuit occurs, there will be a substantial drop in gap voltage which will initiate electrode backup to permit continuance of proper machining across the proper gap spacing.

The present invention incorporates a second coil referred to hereinafter as biasing coil 20 which is included in servo valve 21 and serves to supplement servo control coil 18 and, further has connected thereto an adjustable balancing circuit. The circuit according to the present invention is particularly adapted for combined balancing and manual control of a servo valve. By "servo valve" I mean any electrically operated device controlling the fluid flow in a system which device has a relatively proportional linear change in output flow to varying voltages thereacross. The balancing circuit comprises a DC source 22 which is illustrated as a DC supply but might alternately be derived from the main machining power supply included in the power supply 14. Also included in the balancing circuit are a plurality of equal value, relatively low impedance resistors 28, 30, 32, 34 connected in pairs as shown across DC source 22. The above-mentioned resistors may be, for example, of a value of 1,500 ohms. It is essential that the resistor in each pair have substantially equal value. By "substantially equal value" I mean that the difference between matched pairs shall not be more than two to one. In the employment of the balancing circuit for servo valve balancing, it is preferable that the value of impedance of the low impedance resistors 32 or 34 shall be less than the impedance of the biasing coil 20. Resistance of resistor 28 must be substantially equal to that of resistor 30 while the resistance of resistor 32 must be substantially equal to that of resistor 34. A linear potentiometer 36 is also connected across DC source 22 with its resistance having a relatively high impedance value as compared to the value of each of the resistors hereinabove referred to. The magnitude of the resistance of potentiometer 36 may be, for example, 10,000 ohms. The ratio of the impedance of the resistance of potentiometer to that of resistors 28, 30, 32, 34, taken singly, is ideally within the range of three to one or ten to one.

In order to achieve a null adjustment of the system, the movable contact of potentiometer 36 may be moved upwardly or downwardly by the operator as required. By reason of the relationship between the impedances of potentiometer 36 and of that of the several resistors, it will be seen that the initial movement of the sliding contact with potentiometer 36 from its central position will have relatively small effect on the system. The tendency of over-correction about the critical null range of the servo value by the initial movement of the movable contact is thus substantially removed. As the movable contact is advanced toward either terminal of potentiometer 36, there occurs greatly increased sensitivity and effect thereby permitting a single knob balancing and velocity control.

While the present invention has been illustrated in connection with a servo feed system for electrical discharge machining, it will become apparent to those skilled in the art that the invention is not limited to this environment but is readily applicable to any electrohydraulic servo system or resistance element requiring these unique characteristics.

I claim:

1. In an electrically operated hydraulic system having a servo valve responsive to an electrical control signal provided thereto, an adjustable balancing system for said servo valve comprising, a bias coil operatively connected to control said servo valve, a DC source, a first pair of substantially equal value, relatively low impedance resistors connected across said source, a second pair of substantially equal value, relatively low impedance resistors connected across said source, a potentiometer including a movable contact and having a linear resistance of relatively high impedance connected across said source, said bias coil having one terminal connected to the junction of said first pair of resistors and the other terminal connected to the junction of said second pair of resistors and to said movable contact of said potentiometer for manipulative adjustment.

2. The combination as set forth in claim 1 in which the ratio of the impedance of said potentiometer to the impedance of each of said resistors is within the range of 3 to 1 and 10 to 1.

3. The combination as set forth in claim 1 wherein the impedance of the resistors utilized is less than the impedance of said bias coil.

4. In an electrically operated hydraulic system having a servo valve responsive to an electrical control signal provided thereto, an adjustable balancing system for said servo valve comprising, a bias coil operatively connected to control said servo valve, a DC source operatively connected to one terminal of said bias coil, a pair of substantially equal value, relatively low impedance resistors connected in series across said source, a potentiometer including a movable contact and having a linear resistance of relatively high impedance connected across said source, the other terminal of said bias coil connected to the junction of said pair of resistors and to the movable contact of said potentiometer.

5. The combination as set forth in claim 4 in which the impedance of the resistors utilized is less than the impedance of said bias coil.

6. The combination as set forth in claim 4 wherein the ratio of the impedance of said potentiometer impedance to the impedance of either of said resistors is within the range of 3 to 1 and 10 to 1.

7. A manually adjustable, non-linear operating potentiometer comprising, a DC source, a pair of substantially equal value resistors of relatively low impedance connected in series across said source, a linear resistance of relatively high impedance of said potentiometer connected across said source, and a movable contact connected to the junction of said resistors and in slidable arrangement with said resistance.

8. A manually adjustable, non-linear operating potentiometer comprising, a DC source, a first pair of substantially equal, relatively low impedance resistors connected in series across said source, a second pair of substantially equal, relatively low impedance resistors connected in series across said source, a linear resistance of relatively high impedance of said potentiometer connected across said source, a movable contact of said potentiometer connected to the junction of said second pair of resistors and in slidable engagement with said linear resistance, the junctions of said pairs of resistors adapted to receive a load device therebetween for selective voltage control.

9. A non-linear operating adjustable resistance comprising, a pair of substantially equal value, relatively low impedance resistors connected in a series combination, a linear resistance of relatively high impedance connected across said series combination, and a movable contact connected to the junction of said resistors and in slidable engagement with said linear resistance.

10. The combination as set forth in claim 9 wherein the ratio of the impedance of said linear resistance to one of said resistors is within the range of 3 to 1 and 10 to 1.

References Cited

UNITED STATES PATENTS 3,255,291   6/1966 Weisgerber _____ 314—61 X

LEE T. HIX, *Primary Examiner.*